United States Patent
Sakai

(10) Patent No.: US 7,623,737 B2
(45) Date of Patent: Nov. 24, 2009

(54) INFORMATION PROCESSING APPARATUS, CONTROL METHOD AND CONTROL PROGRAM FOR REGISTRATION OF INFORMATION RELATED TO GROUND TINT

(75) Inventor: Hiroshi Sakai, Sakai (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 369 days.

(21) Appl. No.: 11/192,100

(22) Filed: Jul. 29, 2005

(65) Prior Publication Data

US 2006/0228045 A1   Oct. 12, 2006

(30) Foreign Application Priority Data

Apr. 11, 2005   (JP) .............................. 2005-113748

(51) Int. Cl.
*G06K 9/32*   (2006.01)
(52) U.S. Cl. ...................... 382/294; 382/284
(58) Field of Classification Search .................. 382/294
See application file for complete search history.

(56) References Cited

U.S. PATENT DOCUMENTS

| 5,149,140 A | 9/1992 | Mowry, Jr. et al. |
| 5,297,815 A | 3/1994 | Anderson et al. |
| 6,000,728 A * | 12/1999 | Mowry, Jr. .................... 283/93 |
| 6,139,066 A * | 10/2000 | Mowry et al. ................. 283/93 |
| 2005/0052705 A1 * | 3/2005 | Hersch et al. ............. 358/3.28 |
| 2005/0058476 A1 * | 3/2005 | Murakami ................... 399/366 |
| 2005/0219634 A1 * | 10/2005 | Murakami ................. 358/3.28 |

FOREIGN PATENT DOCUMENTS

| JP | 4-213769 | 8/1992 |
| JP | 2002-077571 | 3/2002 |
| JP | 2002-248829 | 9/2002 |
| JP | 2004-223854 | 8/2004 |
| JP | 2004-228896 | 8/2004 |
| JP | 2004-304597 | 10/2004 |
| JP | 2005-91730 | 4/2005 |

* cited by examiner

*Primary Examiner*—Samir A. Ahmed
*Assistant Examiner*—Stephen R Koziol
(74) *Attorney, Agent, or Firm*—Buchanan Ingersoll & Rooney PC

(57) ABSTRACT

In an information processing apparatus, an image pattern of a background and an image pattern of a latent image are selected from image patterns stored in a storage unit. Image data of a ground tint is generated based on the selected image patterns. Following display of the generated image data of a ground tint, a predetermined operation is input at the operation unit of the image processing apparatus, whereby an image pattern of a background and an image pattern of a latent image used in the generated image data of a ground tint are registered at an image processing apparatus.

21 Claims, 17 Drawing Sheets

| | PATTERN 1 | PATTERN 2 | PATTERN 3 | PATTERN 4 | PATTERN 5 |
|---|---|---|---|---|---|
| LATENT IMAGE PATTERN |  |  |  |  |  |

| | PATTERN 1 | PATTERN 2 | PATTERN 3 | PATTERN 4 | PATTERN 5 |
|---|---|---|---|---|---|
| BACKGROUND PATTERN |  |  |  |  |  |

FIG.19

| BACKGROUND PATTERN M \ LATENT IMAGE PATTERN N | 1 | 2 | 3 | 4 | 5 |
|---|---|---|---|---|---|
| 1 | V | V | V | V | V |
| 2 |  |  | V | V |  |
| 3 |  |  |  |  |  |
| 4 |  |  |  |  |  |
| 5 |  |  |  |  |  |

FIG.20

| MAGNIFICATION | ×1.5 | ×2.0 | ×0.5 |
|---|---|---|---|
| ON/OFF | V |  |  |

INFORMATION PROCESSING APPARATUS, CONTROL METHOD AND CONTROL PROGRAM FOR REGISTRATION OF INFORMATION RELATED TO GROUND TINT

This application is based on Japanese Patent Application No. 2005-113748 filed with the Japan Patent Office on Apr. 11, 2005, the entire content of which is hereby incorporated by reference.

BACKGROUND OF THE INVENTION

1. Field of the Invention

The present invention relates to information processing apparatuses, particularly an information processing apparatus used in the registration of information related to a ground tint at an image processing apparatus, a control method thereof, and a control program thereof.

2. Description of the Related Art

For the purpose of preventing inappropriate photocopying, there is conventionally used the approach of forming the so-called ground tint on a paper sheet so that indication such as a character string of "COPY PROHIBITED" appears when the document is subjected to a photocopying process.

The ground tint includes, for example, a background, and a latent image constituting information such as character string set forth above. The ground tint is provided in a manner so as to ensure concealment of the indication such as the character string set forth above on the sheet where the ground tint is provided, and so as to render the character string legible through a photocopying process.

Such techniques related to ground tints are disclosed in various conventional documents.

For example, Japanese Laid-Open Patent Publication No. 2002-077571 discloses an image data output apparatus that automatically selects a ground tint pattern corresponding to the property of the printer from which an image is to be output (output resolution, color or monochrome photocopy, tone, and the like).

Japanese Laid-Open Patent Publication No. 2004-304597 discloses an image formation apparatus that has a latent image laid out such that the latent image of a ground tint is located at a region identified as an underlying region with respect to the image that is the subject of printing (i.e. a region where characters and the like of the subject image of printing are not located).

Japanese Laid-Open Patent Publication No. 2002-248829 discloses an image processing apparatus that analyzes the PDL (Page Description Language) of the document to be output, and provides an output with the ground tint superimposed when the document is classified document.

Japanese Laid-Open Patent Publication Nos. 2004-223854 and 2004-228896 disclose an image processing apparatus that has the position of each of the group of dots included in the latent image region and/or background region of a ground tint controlled according to the bit value at the bit position corresponding to additional information.

When a ground tint is produced on a paper sheet, the pattern of dots and the like for each of the latent image and background is selected. In the conventional combination of a latent image and background, the gap present at the border between the latent image and background (the region where the pattern constituting the latent image and the pattern constituting the background are not printed) may become so large that the concealment of the contents constituting the latent image could not be ensured.

When a ground tint is to be formed on a paper sheet, it is desirable to ensure the concealment of the contents constituting the latent image on the sheet of the document that is to be subjected to a printing process. Conventionally, sufficient consideration was not taken of the reliability of concealment of the contents constituting the latent image.

SUMMARY OF THE INVENTION

In view of the foregoing, an object of the present invention is to ensure concealment of contents constituting the latent image in a ground tint formed at an image processing apparatus.

According to an aspect of the present invention, an information processing apparatus for registration of information related to a latent image and information related to a background at an image processing apparatus that outputs an image of a ground tint including a latent image and a background, includes: a storage unit storing an image pattern of a background and an image pattern of a latent image; an operation unit accepting an externally applied operation; a pattern selection unit selecting an image pattern of a background and an image pattern of a latent image from the image patterns stored in the storage unit; a ground tint generation unit generating image data of a ground tint using the image pattern selected by the pattern selection unit from the image patterns stored in the storage unit; a display control unit causing a display device to display the image data of a ground tint generated by the ground tint generation unit; and a registration unit registering an image pattern of a latent image and background constituting the ground tint displayed by the display device at the image processing apparatus based on acceptance of a predetermined operation by the operation unit.

A control method of an image processing apparatus according to the present invention for registration of information related to a latent image and information related to a background at an image processing apparatus that outputs an image of a ground tint including a latent image and a background, includes the steps of: storing an image pattern of a background and an image pattern of a latent image, selecting an image pattern of a background and an image pattern of a latent image from the stored image patterns, generating image data of a ground tint using the selected image patterns, causing a display device to display the generated image data of a ground tint, accepting an externally applied operation, and registering an image pattern of a latent image and a background constituting the ground tint displayed by the display device at the image processing apparatus when a predetermined operation is accepted.

A control program of an information processing apparatus for registration of information related to a latent image and information related to a background at an image processing apparatus that outputs an image of a ground tint including a latent image and a background, causes the information processing apparatus to execute the steps of: storing an image pattern of a background and an image pattern of a latent image, selecting an image pattern of a background and an image pattern of a latent image from the stored image patterns, generating image data of a ground tint using the selected image patterns, causing a display device to display the generated image data of a ground tint, accepting an externally applied operation, and registering an image pattern of a latent image and a background constituting the ground tint displayed by the display device at the image processing apparatus when a predetermined operation is accepted.

When an image pattern of a latent image and a background constituting a ground tint is to be registered at an image processing apparatus according to the present invention, the user can visually confirm the ground tint formed of the image pattern that is to be registered prior to registration.

Accordingly, the user can visually confirm that the gap between the latent image and background in a ground tint is inconspicuous to ensure concealment of the latent image, and then register a combination of the image patterns of the latent image and background at the image processing apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 19 schematically shows a pattern combination flag used in the ground tint pattern registration process of FIGS. 17 and 18.

FIG. 20 schematically shows a magnification flag used in the ground tint pattern registration process of FIGS. 17 and 18.

DESCRIPTION OF THE PREFERRED EMBODIMENTS

First Embodiment

Figure 1:
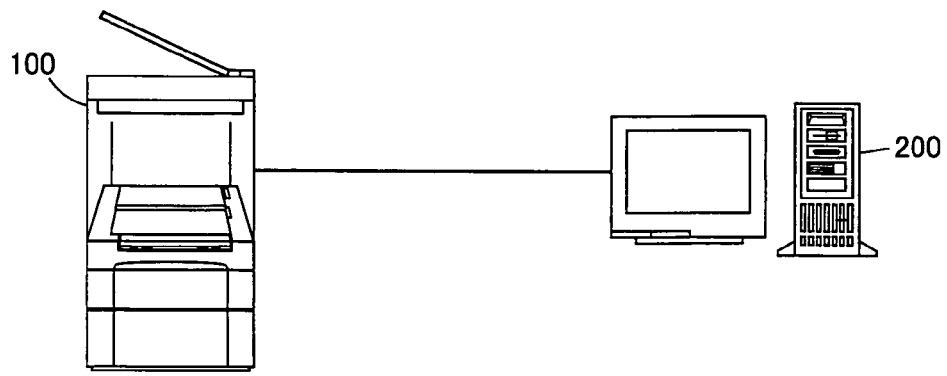
FIG. 1 represents a configuration of an image processing system including a PC (Personal Computer) and an image processing apparatus according to a first embodiment of an information processing apparatus of the present invention.

In the image processing apparatus of FIG. 1, information to output a ground tint is registered at a MFP 100. Accordingly, MFP 100 outputs a ground tint.

Referring to FIG. 1, the image processing system includes MFP 100, and a PC 200 connected via a network or connected in parallel with MFP 100.

Figure 2:
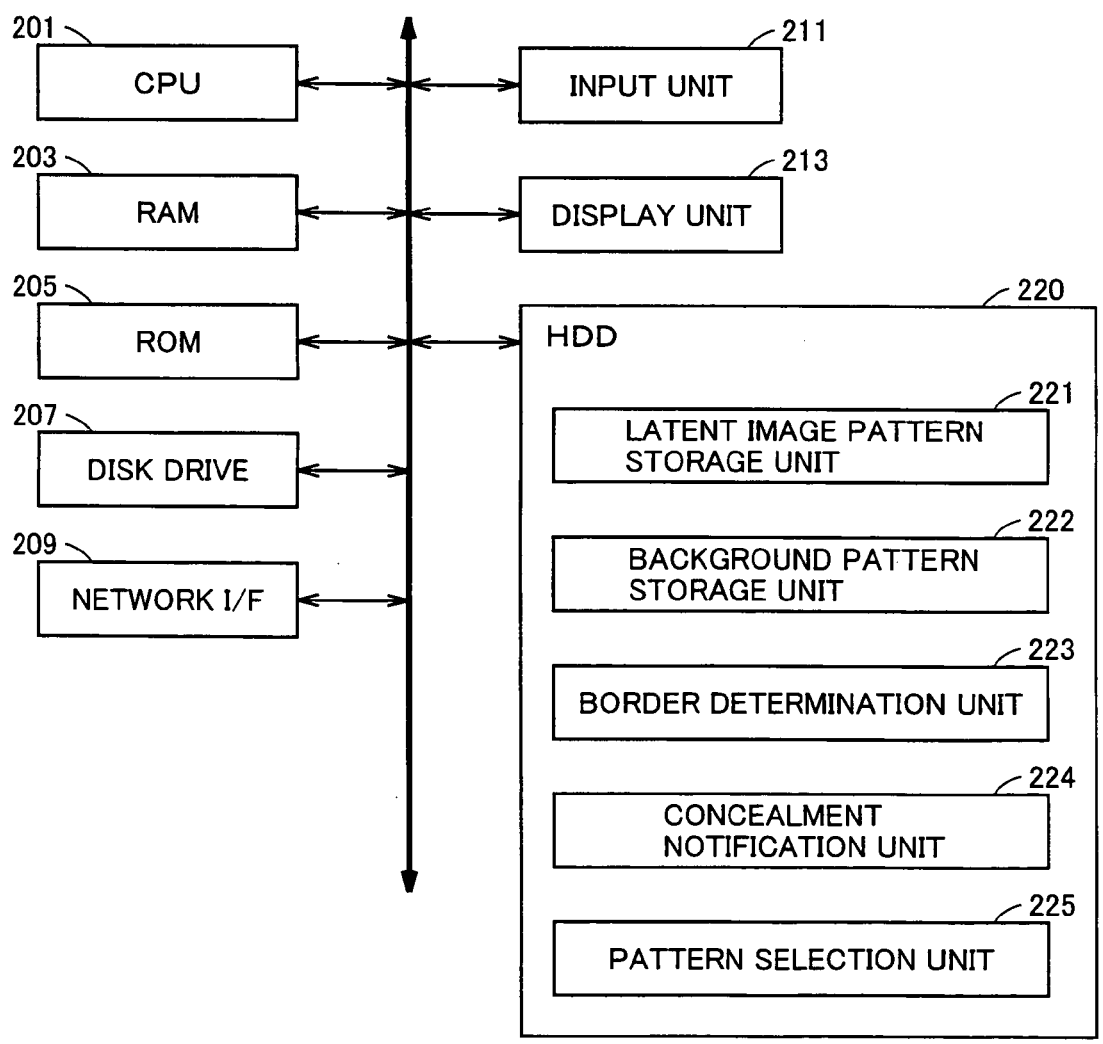
FIG. 2 represents a hardware configuration of the PC of FIG. 1.

Referring to FIG. 2, PC 200 includes a CPU 201 providing entire control of PC 200, a RAM (Random Access Memory) 203 for storing data temporarily, a ROM (Read Only Memory) 205 storing a program, constant, and the like, a disk drive 207 for reading out and writing information with respect to a recording medium such as a flexible disk or a CD-R (Compact Disk Recordable), an I/F (interface) 209 to communicate with MFP 100 and/or another apparatus, an input unit 211 formed of a keyboard, mouse, and the like to accept input of information from the user, a display unit 213 displaying information, and an HDD (Hard Disk Drive) 220 incorporating a hard disk to store image data and the like.

The hard disk of HDD 220 includes a latent image pattern storage unit 221 storing an image pattern to be used for the latent image of a ground tint, a background pattern storage unit 222 storing an image pattern that is to be used for a background, a border determination unit 223 determining whether the border area between the latent image and the background is easily recognized or not when the ground tint is printed out, a concealment notification unit 224 to notify the determination result by border determination unit 223, and a pattern selection unit 225 selecting a combination of a latent image and background constituting the ground tint from latent image pattern storage unit 221 and background pattern storage unit 222. The determination operation carried out by border determination unit 223 will be described in detail afterwards.

Figure 3:
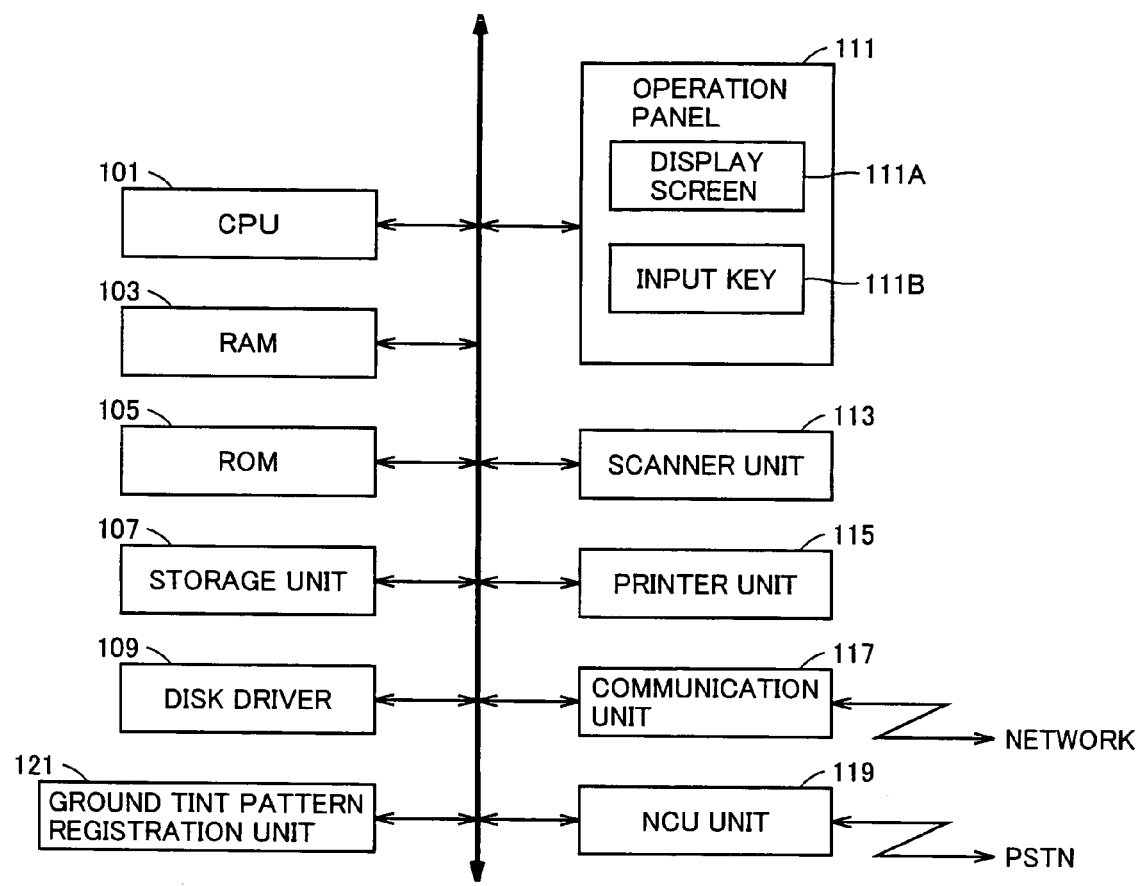
FIG. 3 represents a hardware configuration of the MFP (Multi Function Peripherals) of FIG. 1.

Referring to FIG. 3, MFP 100 includes a CPU 101 providing entire control of MFP 100, a RAM 103, a ROM 105, a storage unit 107 to store image data and the like, a disk drive 109 to read out and write information with respect to a recording medium such as a CD-R, an operation panel 111 accepting an operation from the user, a scanner unit 113 reading out image data, a printer unit 115 printing out image data onto a sheet, a communication unit 117 for connection with a network, an NCU (Network Control Unit) 119 for connection with a PSTN network, and a ground tint pattern registration unit 121 storing information such as a pattern for output of a ground tint. Operation panel 111 includes a display screen 111a to display the status and the like of MFP 100 for the user, and an input key 132. Display screen 111A and input key 111B may be formed of a liquid crystal display and a touch panel mounted thereon.

Figure 4:
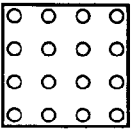
FIG. 4 schematically shows the stored contents in the latent image pattern storage unit of FIG. 2.
Figure 4:
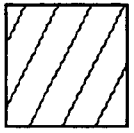
Figure 4:
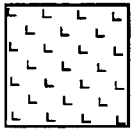
Figure 4:
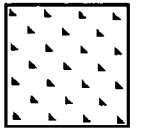
Figure 4:
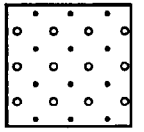

Referring to FIG. 4, latent image pattern storage unit 221 has an image pattern (latent image pattern) used for the latent image of a ground tint stored in association with a number such as pattern 1, pattern 2, and the like.

Figure 5:
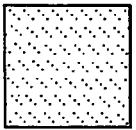
FIG. 5 schematically shows the stored contents in the background pattern storage unit of FIG. 2.
Figure 5:
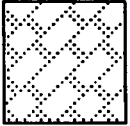
Figure 5:
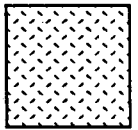
Figure 5:
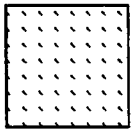
Figure 5:
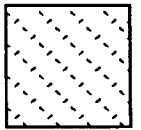

Referring to FIG. 5, background pattern storage unit 222 has an image pattern (background pattern) used for the background of a ground tint stored in association with a number such as pattern 1, pattern 2, and the like.

The number of patterns stored in latent image pattern storage unit 221 and background pattern storage unit 222 is not limited to those shown in FIGS. 4 and 5.

In ground tint pattern registration unit (refer to FIG. 3), information of a character string and the like identified as a latent image (latent image composition information), a latent image pattern used for forming the character string of the latent image, and the background pattern used for the background when the latent image constitutes the character string, are stored in association as ground tint pattern information.

In the image processing system of the present embodiment, the ground tint pattern information can be set and registered at MFP 100 by operating PC 200. The ground tint pattern registration process executed by CPU 201 of PC 200 during the setting and registration of ground tint pattern information will be described hereinafter.

When an operation to start registration of a ground tint pattern is effected and information that designates latent image composition information is input, a ground tint pattern registration process is initiated.

Figure 6:
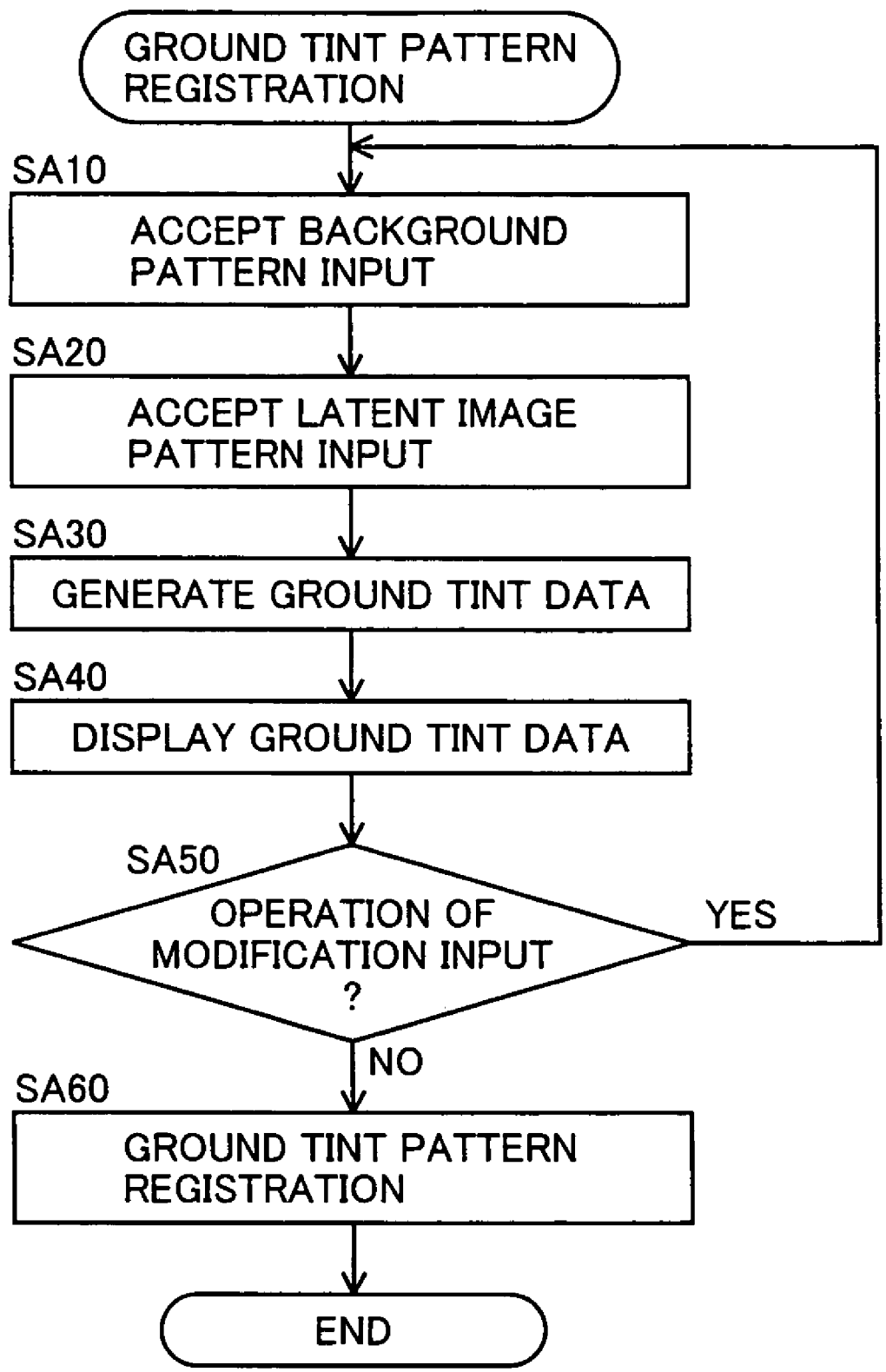
FIG. 6 is a flow chart of the ground tint pattern registration process executed by the CPU (Central Processing Unit) of FIG. 2.
Figure 7:
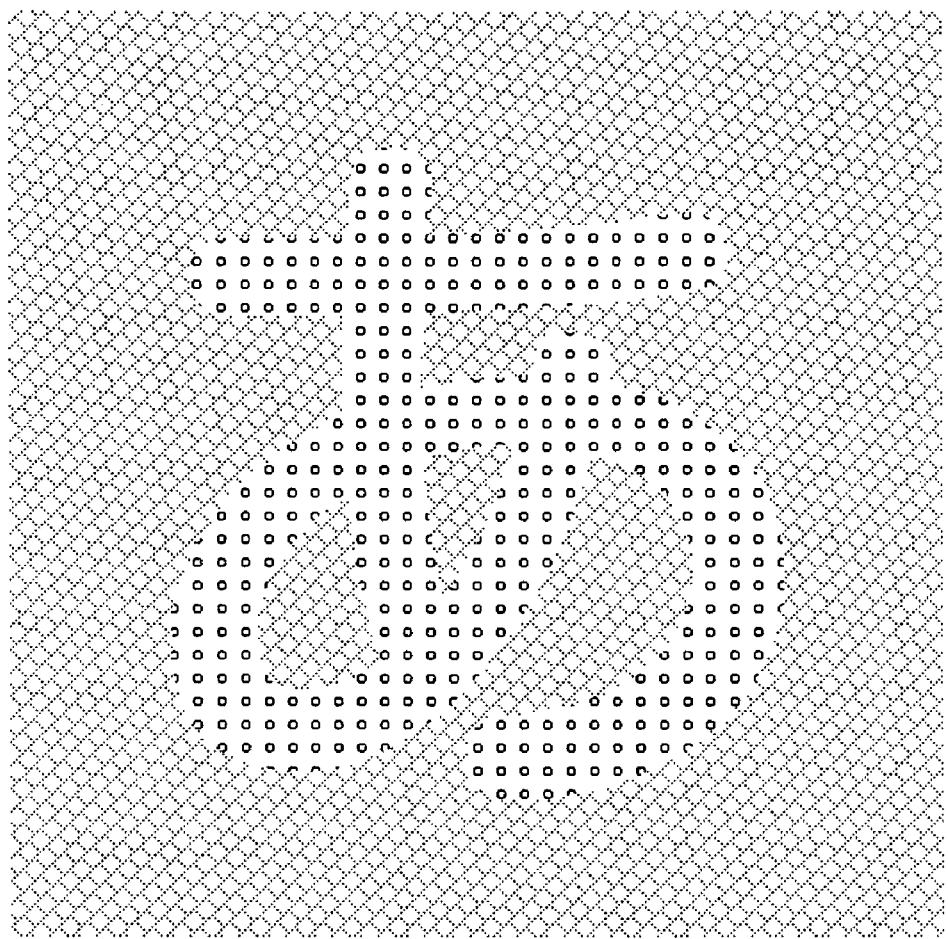
FIGS. 7-11 show a partial enlargement of examples of a ground tint displayed in the ground tint pattern registration process of FIG. 6.
Figure 8:
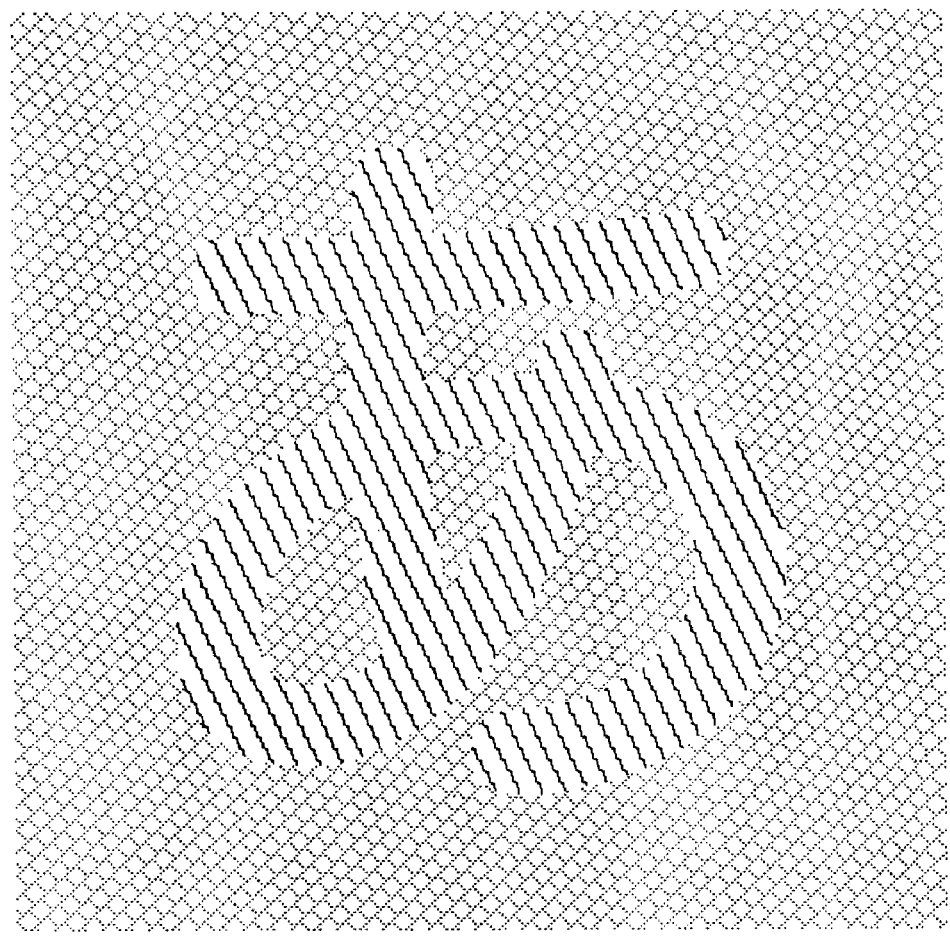
Figure 9:
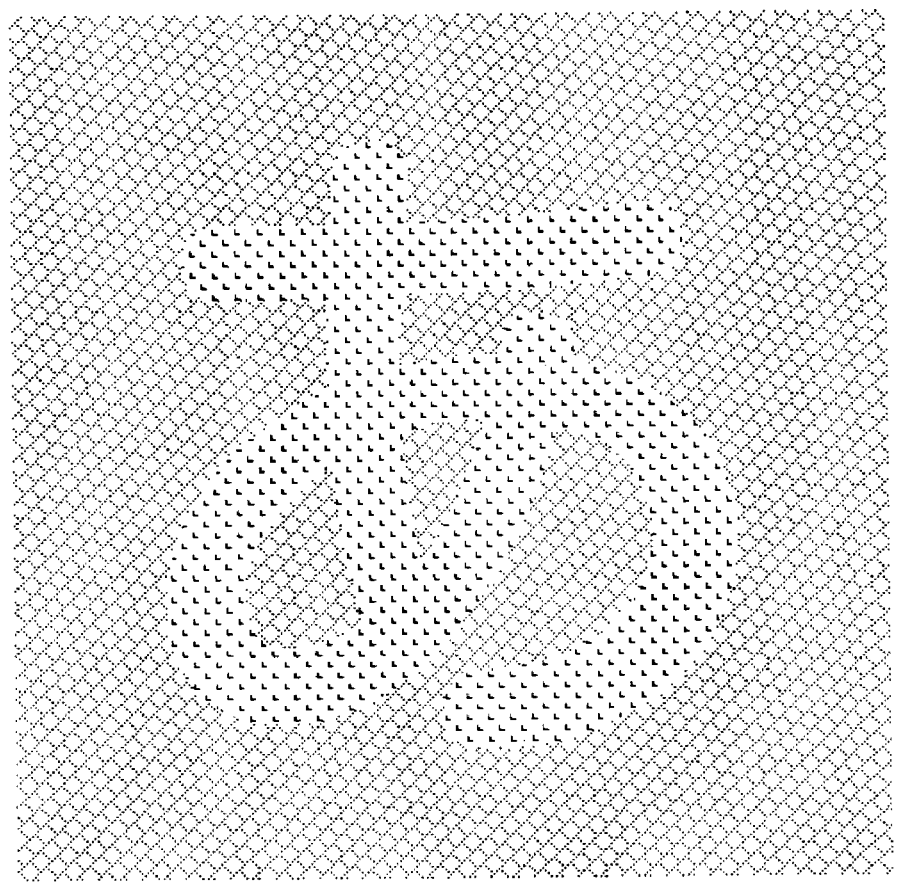
Figure 10:
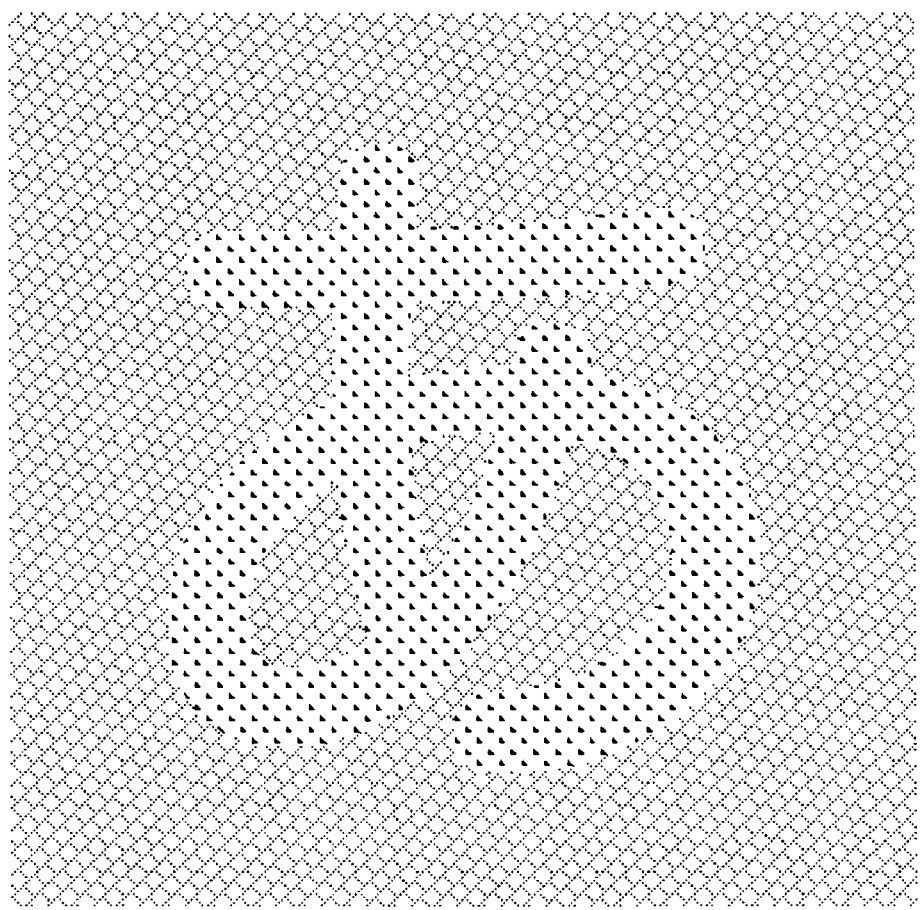
Figure 11:
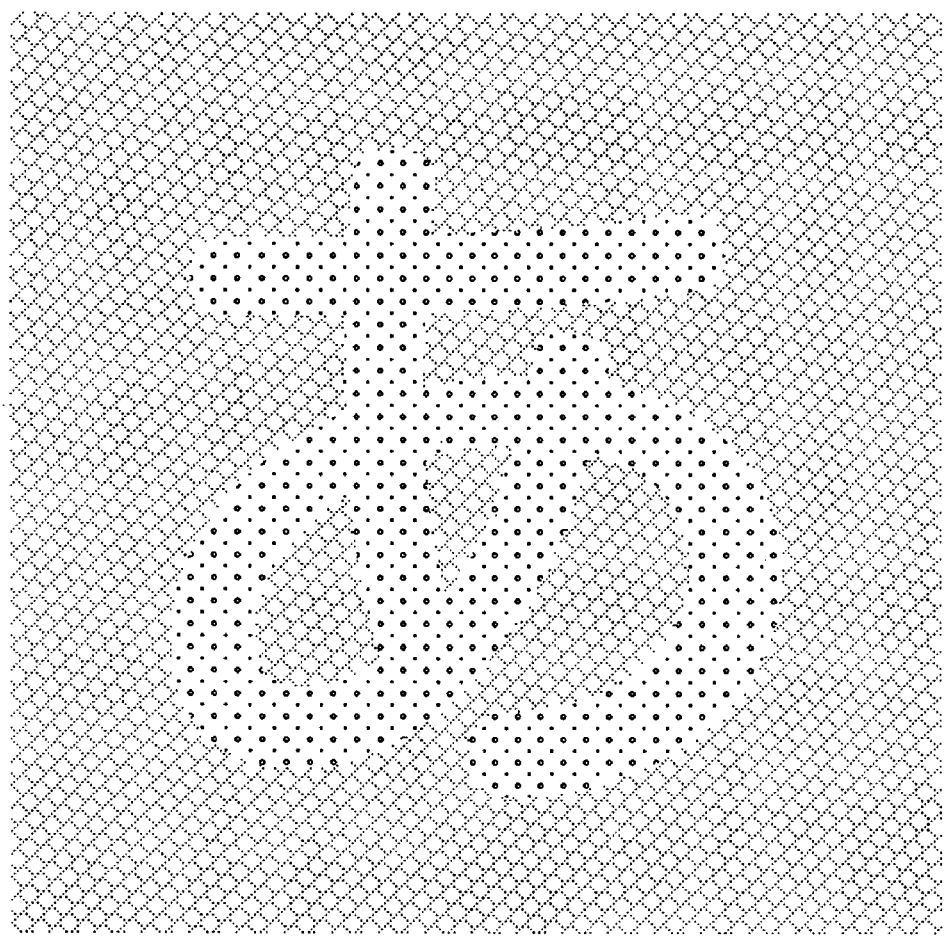

Referring to FIG. 6, at step SA10 in the ground tint pattern registration process, CPU 201 accepts input of information designating the pattern of the background of the ground tint.

At step SA10, CPU 201 causes display unit 213, for example, to display a list of the background patterns stored in background pattern storage unit 222, as shown in FIG. 5, and accepts information of selecting any of the background patterns.

At step SA20, CPU 201 accepts input of information that designates the pattern of a latent image of the ground tint. At step SA20, CPU 201 causes display unit 213, for example, to display a list of latent image patterns stored in latent image pattern storage unit 221, as shown in FIG. 4, and accepts information of selecting any of the listed patterns.

At step SA30, CPU 201 generates a ground tint using the latent image composition information based on the background pattern and latent image pattern that are accepted at steps SA10 and SA20, respectively, and then causes display unit 213 to display the generated ground tint at step SA40. When a ground tint is to be generated, CPU 201 causes pattern selection unit 225 to select an appropriate one from the image patterns stored in latent image pattern storage unit 221 and background pattern storage unit 222 based on the contents of the selected background pattern and latent image pattern.

FIGS. 7-11 represent a portion of examples of ground tints displayed at step SA40, each shown at ×4 magnification. FIGS. 7-11 correspond to examples having "pattern 3" selected from the five patterns shown in FIG. 5 as the background pattern. With respect to the latent image, FIGS. 7-11 correspond to examples where "pattern 1", "pattern 2", "pattern 3", "pattern 4", and "pattern 5", respectively, are selected from the latent image patterns shown in FIG. 4. In other words, a ground tint corresponding to any one of FIGS. 7-11, for example, is displayed at step SA40.

FIGS. 7-11 correspond to examples that include a character in the latent image composition information. In practice, a ground tint in which the latent image constitutes the latent image composition information selected prior to the ground tint pattern registration process is displayed at step SA40.

When the ground tint is displayed at step SA40, the entire ground tint, or a portion of the ground tint including the border area between the latent image and the background, may be displayed.

At step SA50, CPU 201 determines whether an operation of modifying at least one of the background pattern and the latent image pattern has been conducted on the ground tint displayed at step SA40.

Specifically, the user views the display provided at step SA40 to determine whether the information constituting the latent image is discernible at the stage of the ground tint, when information such as a character string corresponding to the latent image is to be represented in the ground tint, for example, such as in the case where a relatively large blank space is distinct at the border between the background and the latent image based on the combination of the background pattern and latent image pattern currently selected. When determination is made of being discernible, an operation to modify at least the background pattern or latent image pattern is conducted.

CPU 201 returns control to step SA10 when determination is made of an operation to modify is input by the user at step SA50, otherwise, proceeds to step SA60. The background pattern selected at step SA10 and the latent image pattern selected at step SA20 are updated every time step SA10 and step SA20 are executed.

At step SA60, CPU 201 causes ground tint pattern registration unit 121 to store the latent image composition information selected prior to the ground tint pattern registration process, the latent image pattern selected at step SA20, and the background pattern selected at step SA10, in association, as ground tint pattern information.

In the image processing system of the present embodiment set forth above, the user can register information of a ground tint output from MFP 100 by operating PC 200. For registration, the user first selects respective image patterns of the background and latent image stored in PC 200. Accordingly, PC 200 generates and displays a relevant ground tint based on the selected patterns. The user visually confirms the displayed ground tint to enter information of whether to modify the selected image pattern or not to PC 200. In response to input of information designating modification, PC 200 allows the user to reselect a pattern, and generates a ground tint again. When input of information designating no modification is input, PC 200 registers the background pattern and latent image pattern selected at that point in time at ground tint pattern registration unit 121 in association with the latent image composition information.

The above embodiment was described in which the ground tint pattern information is set and registered at MFP 100 by operating PC 200 in the image processing system.

The image processing system may be implemented so as to set and register the ground tint pattern information by operating MFP 100.

In this case, elements required for the ground tint pattern registration process among the elements constituting PC 200 are to be incorporated in MFP 100. Specifically, MFP 100 will include a storage device corresponding to latent image pattern storage unit 221 and background pattern storage unit 222, for example. CPU 101 executes the ground tint pattern registration process described with reference to FIG. 6. In other words, CPU 101 executes the steps of displaying a list of background patterns and latent image patterns on display screen 111A, accepting information of selecting a background pattern and a latent image pattern from the user, generating and displaying a ground tint using the accepted background pattern and latent image pattern, accepting information of selecting again a background pattern and/or latent image pattern when information of modifying the pattern is input by the user to generate and display of a ground tint based on the reselected pattern, and when information of not desiring modification of the pattern is input from the user, registering the currently-selected background pattern and latent image pattern at ground tint pattern registration unit 121 in association with the latent image composition information.

Second Embodiment

An information processing apparatus and image processing apparatus of the second embodiment may have a hardware configuration similar to that of PC 200 and MFP 100 described in the first embodiment. The information processing apparatus and image processing apparatus of the second embodiment will be described hereinafter mainly based on the difference from the first embodiment.

Figure 12:
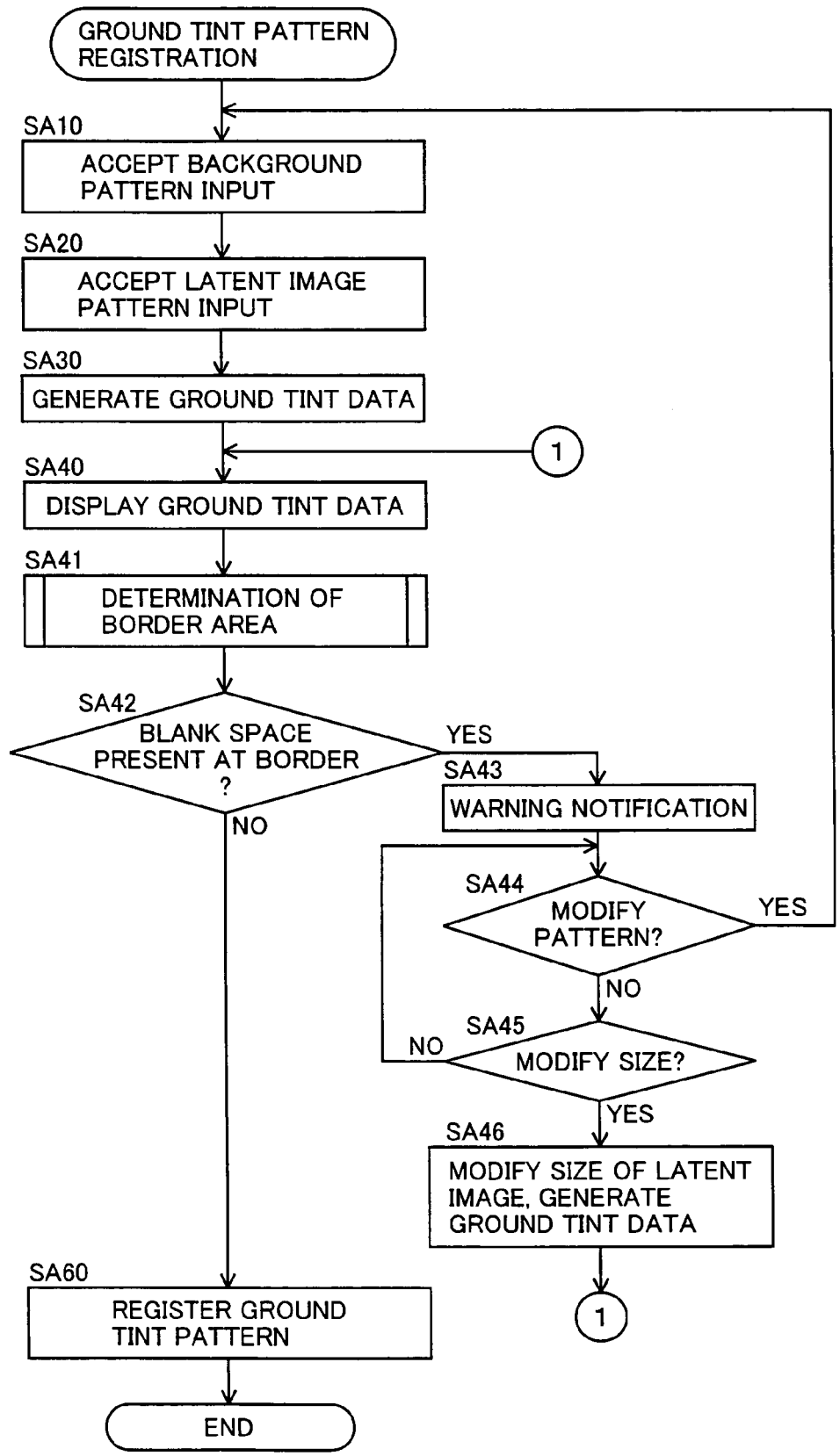
FIG. 12 is a flow chart of a ground tint pattern registration process executed by the CPU of the PC according to a second embodiment of the present invention.

PC 200 of the second embodiment differs from PC 200 of the first embodiment in that a portion of the ground tint pattern registration process to be executed differs. FIG. 12 is a flow chart of a ground tint pattern registration process executed by a CPU 201 of PC 200 of the second embodiment (hereinafter, simply referred to as "CPU 201").

Referring to the ground tint pattern registration process of FIG. 12, CPU 201 accepts input of information that designates the background pattern of a ground tint at step SA10, accepts input of information that designates a latent image pattern of the ground tint at step SA20, generates a ground tint at step SA30, and then causes display unit 213 to display the generated ground tint at step SA40.

Figure 13:
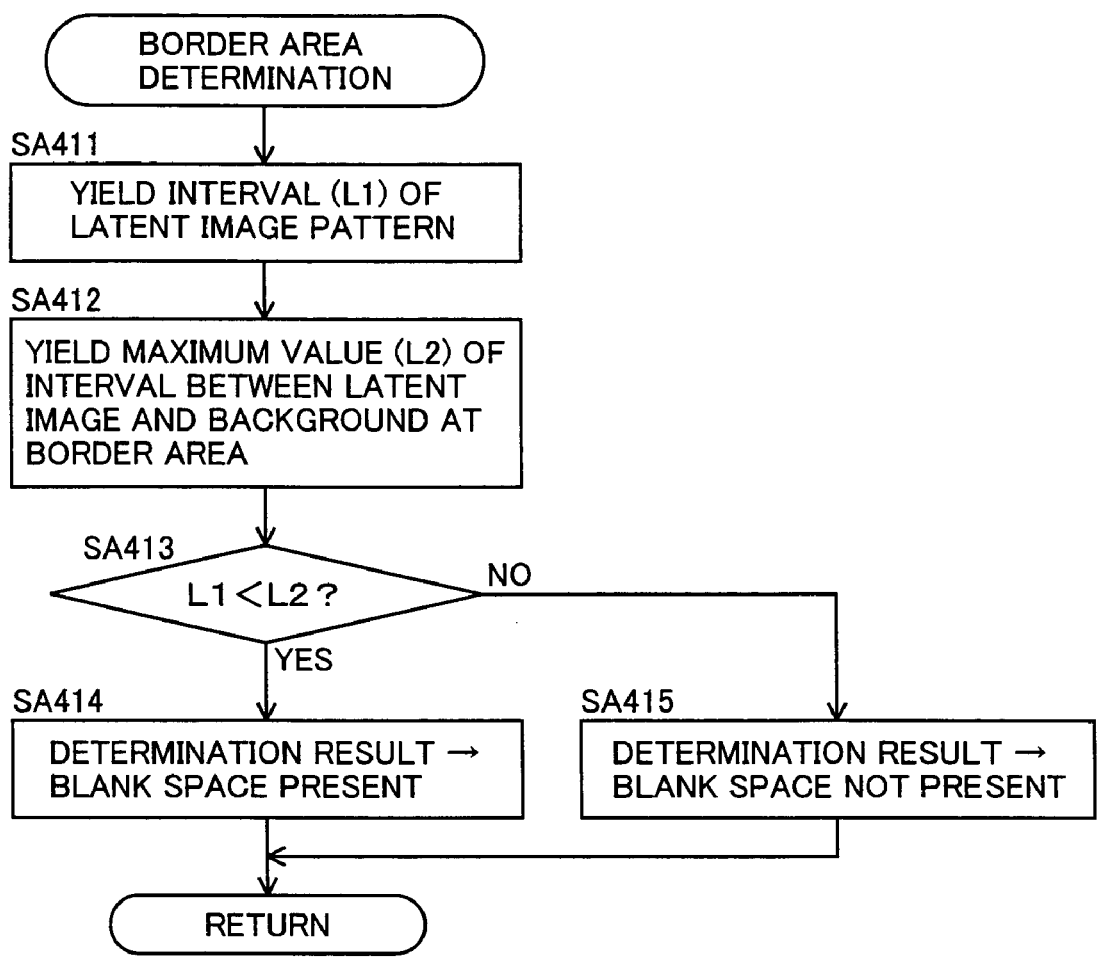
FIG. 13 is a flow chart of a subroutine of a border area determination process of FIG. 12.

At step SA41, CPU 201 executes the border area determination process on the ground tint generated at step SA30 through border determination unit 223. The contents of the border area determination process will be described in detail hereinafter with reference to FIG. 13.

Figure 14:
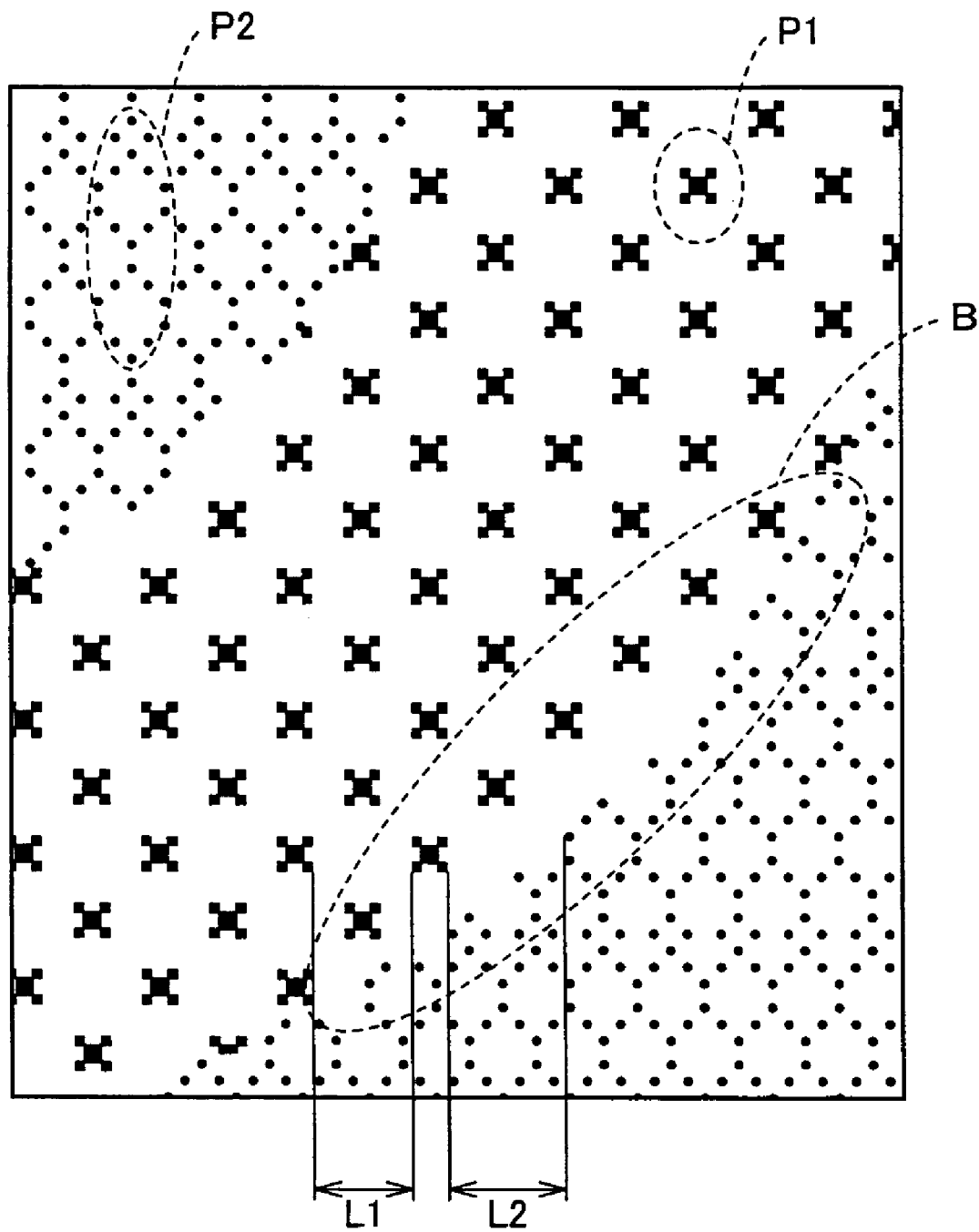
FIGS. 14 and 15 are diagrams to describe L1 and L2 in the border area determination process of FIG. 13.

In the border area determination process, CPU 201 yields an interval L1 of the latent image pattern at step SA411. This interval of the latent image pattern is the distance in the horizontal direction between adjacent patterns constituting the image of the latent image, as shown in FIG. 14. In FIG. 14, the latent image pattern is represented by pattern P1, whereas the background pattern is represented by pattern P2. The interval of the latent image pattern is determined by, for example, plotting a graph of the density value of the image in the horizontal direction and detecting the frequency thereof.

At step SA412, CPU 201 yields the maximum value (L2) of the interval of the printed out region (the area with printed ink on the sheet) at the border area between the latent image and the background. The interval of the region where the latent image and background are printed refers to the maximum value of the distance in the horizontal direction between the edge of the printed area constituting the latent image and the edge of the printed area constituting the background at the border area B between the latent image and the background, as shown in FIG. 14.

In the present embodiment, the interval of the printed area set forth above corresponds to the picture quality change state. Further, the region where there is no printed ink on the sheet at the border area between the latent image and background corresponds to a non-printed region.

At step SA413, CPU 201 determines whether L1 is smaller than L2, and proceeds to step SA414 when L1 is smaller than L2, and proceeds to step SA415 when L1 is not smaller than L2.

Figure 15:
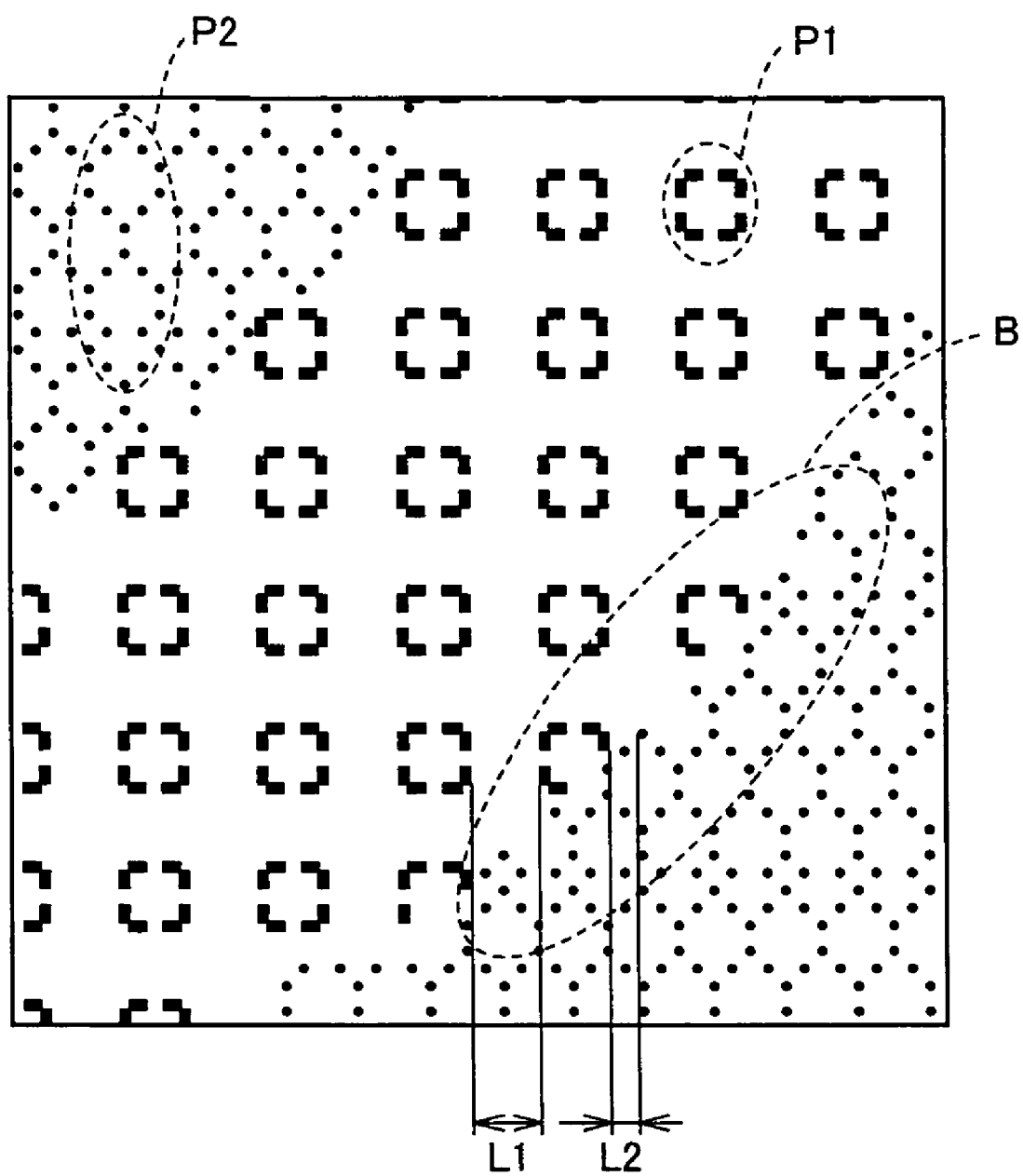

FIG. 14 corresponds to the case where L1 is shorter than L2. FIG. 15 corresponds to the state where L1 is longer than L2. In FIG. 15, the latent image pattern is represented by pattern P3, and the background pattern is represented by pattern P4. It is appreciated from FIGS. 14 and 15 that the relationship between L1 and L2 changes depending upon the combination of the latent image pattern and the background pattern.

At step SA414, the determination result of a blank space being present at the border area between the latent image and background image is stored in RAM 203. Then, the process returns.

At step SA415, the determination result of a blank space not being present at the border area between the latent image and background is stored in RAM 203. Then, the process returns.

Referring to FIG. 12 subsequent to the border area determination process of step SA41, CPU 201 identifies the determination result at step SA42 to proceed to step SA43 corresponding to the result of the presence of a blank space, and otherwise, to step SA60.

At step SA43, CPU 201 causes concealment notification unit 224 to carry out a warning notification process. A warning notification includes, for example, the process of causing display unit 213 to display a message warning that there is a blank space. Additionally, CPU 201 displays a message of recommending the user to modify at least the latent image or background pattern, or modify the size of the latent image composition information. The size of latent image composition information is the point number of the relevant character string (character size) in the case where the latent image composition information is formed of a string of characters.

Figure 16:
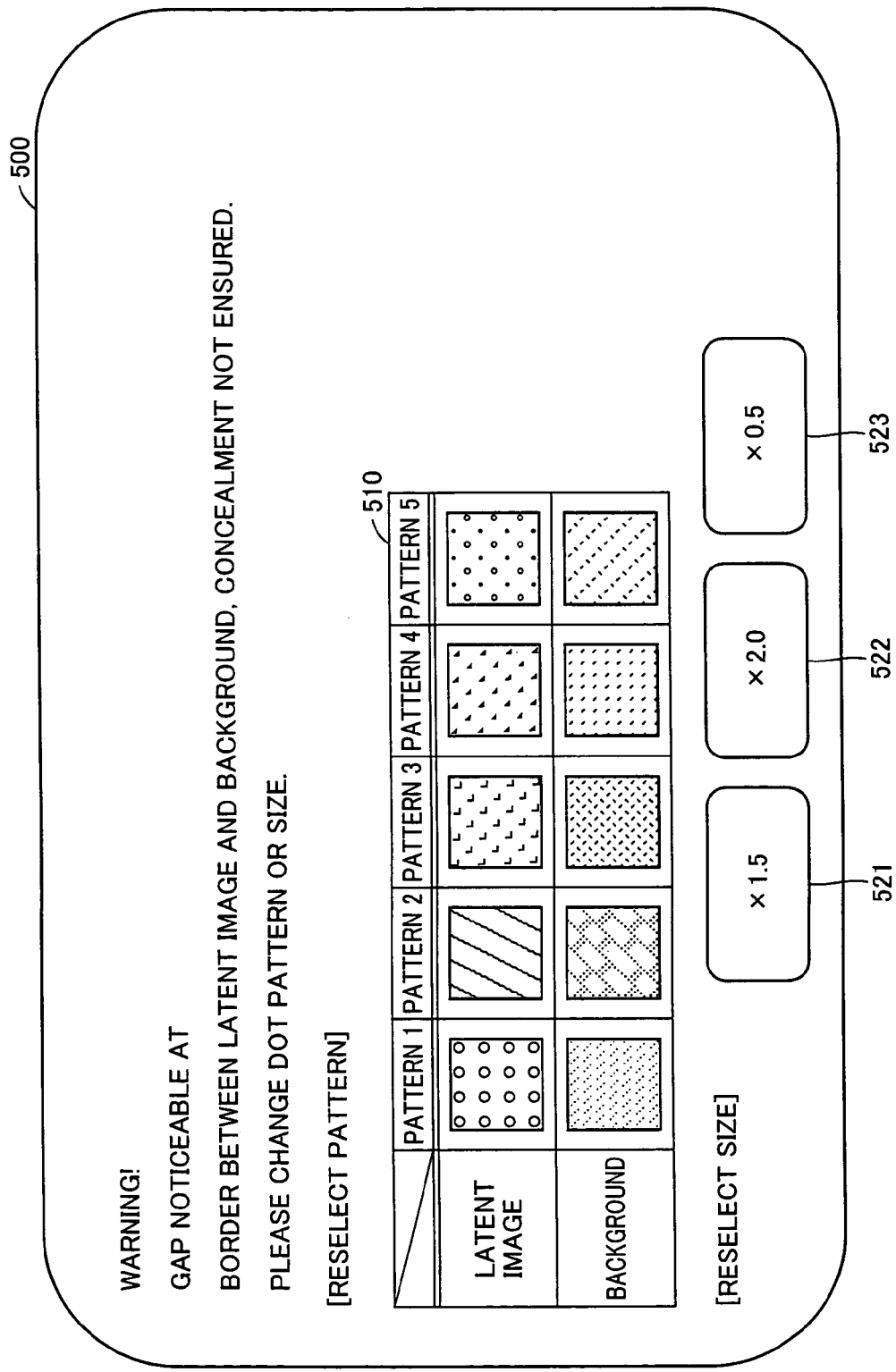
FIG. 16 shows an example of a warning message displayed during the border area determination process of FIG. 13.

An example of a warning message on a screen displayed by display unit 213 at step SA43 is shown in FIG. 16.

A warning message screen 500 of FIG. 16 includes the relevant message, and a display column 510 displaying a list of the latent image patterns and background patterns stored in latent image pattern storage unit 221 and background pattern storage unit 222. Warning message screen 500 also provides the display of keys 521, 522 and 523 to modify the size of the latent image composition information.

Referring to FIG. 12 again, CPU 201 determines whether information of modifying at least one of the patterns of the latent image and background is entered by the user at step SA44. When determination is made of such an input, control returns to step SA10 to accept the input, otherwise, control proceeds to step SA45. Input of information of modifying the pattern can be effected by a touching operation of one of the patterns displayed in display column 510.

At step SA45, CPU 201 determines whether the information of modifying the size of the latent image composition information is input by the user or not. When determination is made that such information is input, control proceeds to step SA46. Input of information to modify the size can be conducted, for example, through a touching operation of any of keys 521-523.

At step SA46, CPU 201 accepts the size input by the user to regenerate the ground tint data so as to form the latent image composition information at the relevant size. Then, control returns to step SA40.

When determination is made that there is no blank space at step SA42, CPU 201 proceeds to step SA60 to cause ground tint pattern registration unit 121 to store the latent image composition information selected prior to the ground tint pattern registration process, as well as the latent image pattern and backward pattern selected at that point in time, in association, as ground tint pattern information. Then, the process ends.

In the above-described embodiment, determination is made whether a relatively large unfilled space appears at the border between the background and latent image in the ground tint, based on the presence of a blank space by PC 200 in the registration of ground tint pattern information. Accordingly, the user can cause MFP 100 to output a ground tint ensured in concealment of the latent image composition information more readily. It is to be noted that the ground tint pattern registration process may be implemented by MFP 100 in the present embodiment.

Third Embodiment

An information processing apparatus and image processing apparatus of the third embodiment can be implemented with the same hardware configuration as that of PC 200 and MFP 100 described in the first and second embodiments. The information processing apparatus and image processing apparatus of the present embodiment will be described based on mainly the difference from the first and second embodiments.

Figure 17:
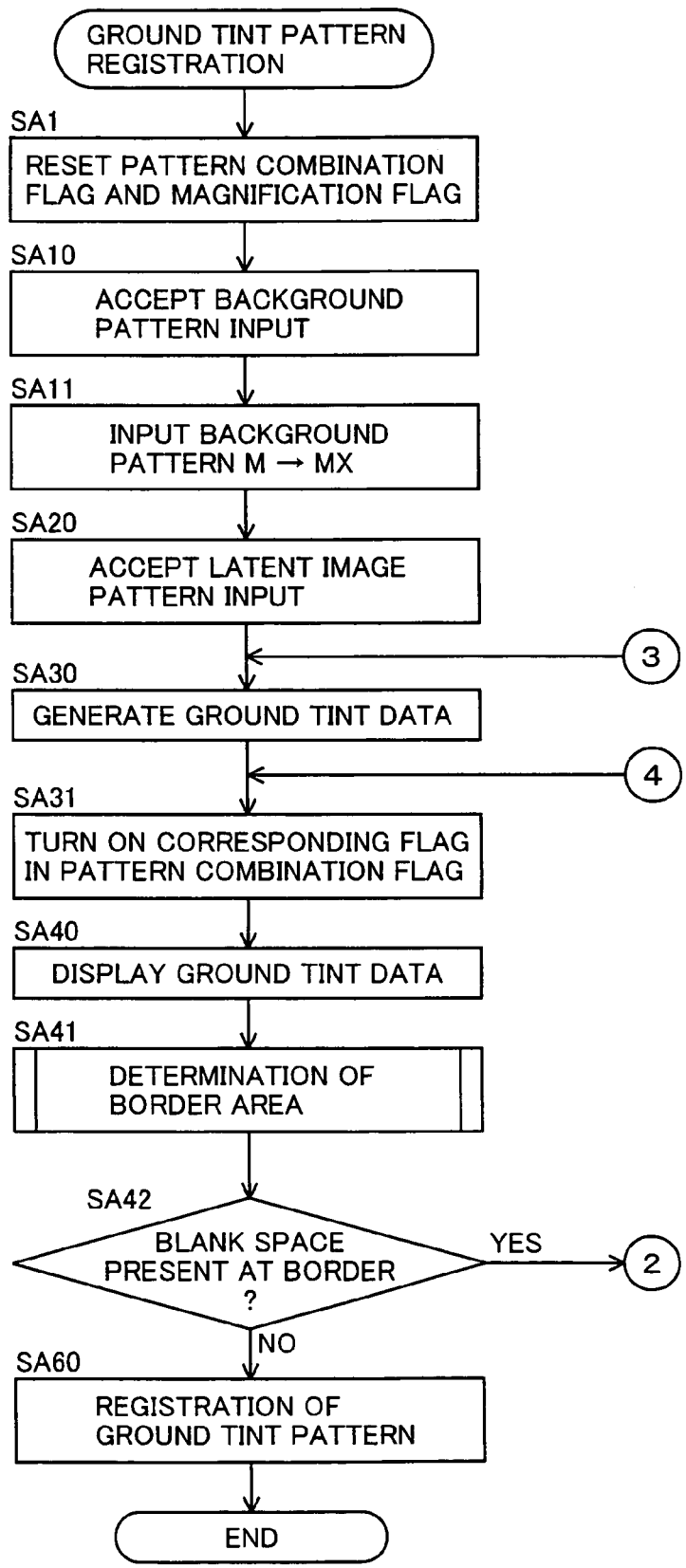
FIGS. 17 and 18 are flow charts of a ground tint pattern registration process executed by the CPU of the PC according to a third embodiment of the present invention.
Figure 18:
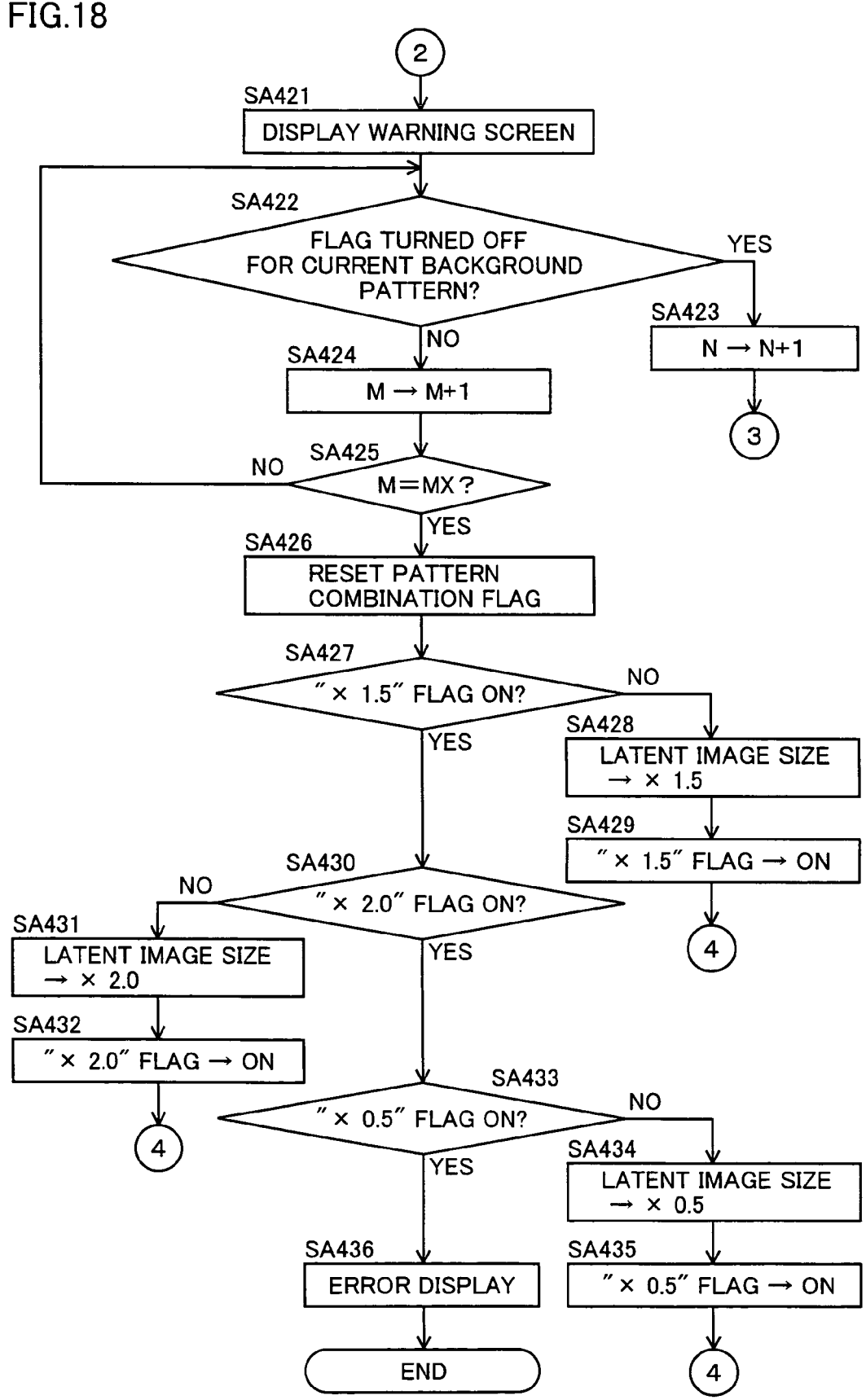

The ground tint pattern registration process executed by CPU 201 of PC 200 of the third embodiment corresponds to a partially-modified version of the ground tint pattern registration process executed by CPU 201 of PC 200 of the second embodiment. FIGS. 17 and 18 are flow charts of the ground tint pattern registration process executed by CPU 201 of PC 200 of the third embodiment (hereinafter, simply referred to as "CPU 201").

In the ground tint pattern registration process executed in the present embodiment, flags such as a pattern combination flag and magnification flag are defined in RAM 203.

The pattern combination flag includes a flag defined for each of all the combinations of latent image patterns and background patterns, as schematically shown in FIG. 19. In FIG. 19, an ON state of the flag is represented by "V". A flag turned off is represented by an empty cell. In the present embodiment, a variable N and a variable M are employed as the information to specify a latent image pattern and a background pattern, respectively. By determining respective values of variables N and M in the generation of a ground tint, the latent image pattern and background pattern employed in generating a ground tint are specified.

The magnification flag includes flags defined for three types of magnification (×1.5, ×2.0, and ×0.5) that are preset as the size of the latent image composition information. In FIG. 20, an ON state of the flag is represented by "V". A flag turned off is represented by an empty cell.

Referring to the ground tint pattern registration process of FIG. 17, CPU 201 resets (turns off) all the flags of the pattern combination flag and magnification flag at step SA1, and then proceeds to step SA10.

At step SA10, CPU 201 accepts input of information that designates the background pattern of the ground tint, and proceeds to step SA11.

At step SA11, CPU 201 stores the background pattern input accepted at step SA10 with the value of the corresponding variable M as MX in RAM 203, and then proceeds to step SA20.

At step SA20, CPU 201 accepts input of the information that designates the latent image pattern of the ground tint, and proceeds to step SA30.

At step SA30, CPU 201 generates a ground tint based on the currently designated latent image pattern and background pattern, and proceeds to step SA31.

At step SA31, CPU 201 turns on the flag corresponding to the combination of the latent image and background used in the generation at the immediately previous step SA30 for the pattern combination flag, and then proceeds to step SA40.

At step SA40, CPU 201 causes display unit 213 to display the generated ground tint, and proceeds to step SA41.

At step SA41, CPU 201 executes the border area determination process on the ground tint generated at step SA30. The border area determination process is identical to that described with reference to FIG. 13.

At step SA42, CPU 201 identifies the determination result of the border area determination process, and proceeds to step SA421 when the determination result indicates presence of a blank space, and otherwise, to step SA60.

At step SA421, CPU 201 causes concealment notification unit 224 to notify a warning, and then proceeds to step SA422. This warning notification includes, for example, the process of causing display unit 213 to display a message indicative of the presence of an unfilled space.

At step SA422, CPU 201 identifies the pattern combination flag to determine whether there is a flag turned off among the five flags corresponding to the current variable M. When determination is made of the presence of such a flag, variable N is updated by adding 1 at step SA423, and control returns to step SA30. In the case where variable N exceeds 5 (the number of patterns stored in latent image pattern storage unit 221) as a result of the added update at step SA423, CPU 201 resets variable N to the value of 1.

At step SA424, CPU 201 updates the value of M by adding 1. In the case where variable M exceeds 5 (the number of patterns stored in background pattern storage unit 222) as a result of the added update, CPU 201 resets variable M to the value of 1.

At step SA425, CPU 201 determines whether variable M matches the value of MX stored in RAM 203 at step SA11. When the values match, control proceeds to step SA426, otherwise, to step SA422.

At step SA426, CPU 201 resets (turns off) all the combinations of the pattern combination flag, and proceeds to step SA427.

At step SA427, CPU 201 determines whether the ×1.5 flag of the magnification flag is turned on or not. When turned on, control proceeds to step SA430, otherwise, to step SA428.

At step SA428, CPU 201 generates a ground tint with the size of the latent image composition information increased by 1.5 times the ground tint that was initially generated in the ground tint pattern registration process. Then, control proceeds to step SA429.

At step SA429, CPU 201 turns on the ×1.5 flag, and returns to step SA31.

At step SA430, CPU 201 determines whether the magnification flag of ×2.0 is turned on or not. When turned on, control proceeds to step SA433, otherwise, to step SA431.

At step SA431, CPU 201 generates a ground tint with the size of the latent image composition information increased by 2.0 times the ground tint that was initially generated in the ground tint pattern registration process. Then, control proceeds to step SA432.

At step SA432, CPU 201 turns on the ×2.0 flag, and returns to step SA31.

At step SA433, CPU 201 determines whether the magnification flag of ×0.5 is turned on or not. When turned on, control proceeds to step SA436, otherwise, to step SA434.

At step SA434, CPU 201 generates a ground tint with the size of the latent image composition information increased by 0.5 times the ground tint that was initially generated in the ground tint pattern registration process. Then, control proceeds to step SA435.

At step SA435, CPU 201 turns on the ×0.5 flag, and returns to step SA31.

At step SA436, CPU 201 causes concealment notification unit 224 to display an error screen through display unit 213. Then, the process ends. An error screen displays the message of "Gap at the border between latent image and background is discernible, concealment cannot be ensured", for example.

Referring to FIG. 17 again, when the determination result indicates that there is no unfilled space at step SA42, CPU 201 proceeds to step SA60 to cause ground tint pattern registration unit 121 to store the latent image composition information selected prior to the ground tint pattern registration process, as well as the latent image pattern and background pattern selected at that point of time, in association, as the ground tint pattern information. Then, the process ends.

In the present embodiment set forth above, determination is made whether there is a relatively large blank space at the border between the background and latent image in the ground tint by determining whether there is an unfilled space or not by PC 200 in the registration of the ground tint pattern information. In the case where determination is made of the presence of a blank space, PC 200 modifies the background image pattern, the latent image pattern, or the size of the latent image composition information to generate again a ground tint, and then determines again whether a large blank space appears or not. Accordingly, the user can cause MFP 100 to output a ground tint ensured in the concealment of the latent image composition information more readily. In the present embodiment, the ground tint pattern registration process may be implemented to be executed by MFP 100.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus for registration of information related to a latent image and information related to a background at an image processing apparatus that outputs an image of a ground tint including a latent image and a background, comprising:
    a storage unit storing one or more image patterns of a background and one or more image patterns of a latent image;
    a pattern selection unit selecting an image pattern of a background and an image pattern of a latent image from among the image patterns stored in said storage unit;
    a ground tint generation unit generating image data of a ground tint using the image pattern of a background and the image pattern of a latent image selected by said pattern selection unit from the image patterns stored in said storage unit;
    a determination unit determining whether there is a predetermined empty region at a border area between the image pattern of a background and the image pattern of a latent image in the image data of a ground tint generated by said ground tint generation unit; and
    a registration unit registering the image pattern of a background in association with the image pattern of a latent image when said determination unit determines that there is no predetermined empty region at the border area between the image pattern of a background and the image pattern of a latent image.

2. A control method of an information processing apparatus for registration of information related to a latent image and information related to a background at an image processing apparatus that outputs an image of a ground tint including a latent image and a background, comprising the steps of:
    storing one or more image patterns of a background and one or more image patterns of a latent image in a memory unit of the information processing apparatus;
    selecting, in the information processing apparatus, an image pattern of a background and an image pattern of a latent image from among said stored image patterns;
    generating, in the information processing apparatus, image data of a ground tint using said selected image pattern of a background and said selected image pattern of a latent image from among said stored image patterns;
    determining, in the information processing apparatus, whether there is a predetermined empty region at a border area between said image pattern of a background and said image pattern of a latent image in the generated image data of a ground tint; and
    registering said image pattern of a background in association with said image pattern of a latent image in the image processing apparatus by the information processing apparatus, when no predetermined empty region is determined to exist at the border area between said pattern of a background and said image pattern of a latent image.

3. A computer-readable recording medium having a control program of an information processing apparatus stored thereon for registration of information related to a latent image and information related to a background at an image processing apparatus that outputs an image of a ground tint including a latent image and a background, said program causing said information processing apparatus to execute the steps of:
    storing one or more image patterns of a background and one or more image patterns of a latent image;
    selecting an image pattern of a background and an image pattern of a latent image from among said stored image patterns;
    generating image data of a ground tint using said selected image pattern of a background and said selected image pattern of a latent image from among said stored image patterns;
    determining whether there is a predetermined empty region at a border area between said image pattern of a background and said image pattern of a latent image in the generated image data of a ground tint; and
    registering said image pattern of a background in association with said image pattern of a latent image when no predetermined empty region is determined to exist at the border area between said pattern of a background and said image pattern of a latent image.

4. The information processing apparatus according to claim 1, wherein said determination unit is configured to determine that there is a predetermined empty region when a distance between adjacent patterns in the image pattern of a latent image is equal to or less than a distance between adjacent patterns at an end of an image pattern of a background and at an end of an image pattern of a latent image at the border area.

5. The information processing apparatus according to claim 1, wherein said storage unit is configured to store a plurality of image patterns of a background and a plurality of image patterns of a latent image, and said pattern selection unit is configured to select an image pattern of a background or an image pattern of a latent image differing from a previously selected image pattern when said determination unit determines that there is a predetermined empty region.

6. The information processing apparatus according to claim 1, wherein said ground tint generation unit is configured to modify a size of information constituting the latent image to generate new image data of a ground tint when said determination unit determines that there is a predetermined empty region.

7. The information processing apparatus according to claim 1, further comprising:
    a display control unit causing a display device to display the image data of the ground tint generated by said ground tint generation unit; and
    an input unit accepting an input of a designation to modify at least one of an image pattern of a background and an image pattern of a latent image from a user,
    wherein said storage unit is configured to store a plurality of image patterns of a background and a plurality of image patterns of a latent image, and said pattern selection unit is configured to select an image pattern of a background and an image pattern of a latent image after modification when said input unit accepts an input of a designation to modify at least one of an image pattern of a background and an image pattern of a latent image.

8. The information processing apparatus according to claim 7, wherein said display control unit is configured to cause said display device to display a portion including border area between a latent image and a background among the image data of the ground tint generated by said ground tint generation unit.

9. The information processing apparatus according to claim 1, further comprising:
   a display control unit causing a display device to display the image data of the ground tint generated by said ground tint generation unit; and
   an input unit accepting an input of a designation to modify a size of information constituting the latent image from a user,
   wherein said ground tint generation unit is configured to generate new image data of a ground tint based on the modified size of the information constituting the latent image when said input unit accepts the input of the designation to modify the size of the information constituting the latent image.

10. The information processing apparatus according to claim 1, further comprising a communication unit configured to communicate with said image processing apparatus.

11. An image processing apparatus comprising:
   a storage unit storing one or more image patterns of a background and one or more image patterns of a latent image;
   a pattern selection unit selecting an image pattern of a background and an image pattern of a latent image from among the image patterns stored in said storage unit;
   a ground tint generation unit generating image data of a ground tint using the image pattern of a background and the image pattern of a latent image selected by said pattern selection unit from the image patterns stored in said storage unit;
   a determination unit determining whether there is a predetermined empty region at a border area between the image pattern of a background and the image pattern of a latent image in the image data of a ground tint generated by said ground tint generation unit; and
   a registration unit registering the image pattern of a background in association with the image pattern of a latent image when said determination unit determines that there is no predetermined empty region at the border area between the image pattern of a background and the image pattern of a latent image.

12. The image processing apparatus according to claim 11, wherein said determination unit is configured to determine that there is a predetermined empty region when a distance between adjacent patterns in the image pattern of a latent image is equal to or less than a distance between adjacent patterns at an end of an image pattern of a background and at an end of an image pattern of a latent image at the border area.

13. The image processing apparatus according to claim 11, wherein said storage unit is configured to store a plurality of image patterns of a background and a plurality of image patterns of a latent image, and said pattern selection unit is configured to select an image pattern of a background or an image pattern of a latent image differing from a previously selected image pattern when said determination unit determines that there is a predetermined empty region.

14. The image processing apparatus according to claim 11, wherein said ground tint generation unit is configured to modify a size of information constituting the latent image to generate new image data of a ground tint when said determination unit determines that there is a predetermined empty region.

15. The image processing apparatus according to claim 11, further comprising:
   a display control unit causing a display device to display the image data of the ground tint generated by said ground tint generation unit; and
   an input unit accepting an input of a designation to modify at least one of an image pattern of a background and an image pattern of a latent image from a user,
   wherein said storage unit is configured to store a plurality of image patterns of a background and a plurality of image patterns of a latent image, and said pattern selection unit is configured to select an image pattern of a background and an image pattern of a latent image after modification when said input unit accepts an input of a designation to modify at least one of an image pattern of a background and an image pattern of a latent image.

16. The image processing apparatus according to claim 15, wherein said display control unit is configured to cause said display device to display a portion including border area between a latent image and a background among the image data of the ground tint generated by said ground tint generation unit.

17. The image processing apparatus according to claim 11, further comprising:
   a display control unit causing a display device to display the image data of the ground tint generated by said ground tint generation unit; and
   an input unit accepting an input of a designation to modify a size of information constituting the latent image from a user,
   wherein said ground tint generation unit is configured to generate new image data of a ground tint based on the modified size of the information constituting the latent image when said input unit accepts the input of the designation to modify the size of the information constituting the latent image.

18. The image processing apparatus according to claim 11, further comprising an image formation unit configured to combine input image data with a ground tint formed of image patterns of a latent image and a background registered in said registration unit to form an image on a sheet.

19. A control method of an image processing apparatus that outputs an image of a ground tint including a latent image and a background, comprising the steps of:
   storing one or more image patterns of a background and one or more image patterns of a latent image in a storage unit of the image processing apparatus;
   selecting, in the image processing apparatus, an image pattern of a background and an image pattern of a latent image from among the stored image patterns;
   generating, in the image processing apparatus, image data of a ground tint using the selected image pattern of a background and the selected image pattern of a latent image from among the stored image patterns;
   determining, in the image processing apparatus, whether there is a predetermined empty region at a border area between the image pattern of a background and the image pattern of a latent image in the generated image data of a ground tint; and
   registering the image pattern of a background in association with the image pattern of a latent image in the image processing apparatus, when no predetermined empty region is determined to exist at the border area between the image pattern of a background and the image pattern of a latent image.

20. The control method according to claim 2, wherein the image pattern of a background and the image pattern of a latent image are selected by the information processing apparatus in response to a selection of the image pattern of a background and the image pattern of a latent image by a user of the information processing apparatus, from among said storage image patterns.

21. The control method according to claim 19, wherein the image pattern of a background and the image pattern of a latent image are selected by the information processing apparatus in response to a selection of the image pattern of a background and the image pattern of a latent image by a user of the information processing apparatus, from among said storage image patterns.

* * * * *

UNITED STATES PATENT AND TRADEMARK OFFICE
CERTIFICATE OF CORRECTION

| | |
|---|---|
| PATENT NO. | : 7,623,737 B2 |
| APPLICATION NO. | : 11/192100 |
| DATED | : November 24, 2009 |
| INVENTOR(S) | : Hiroshi Sakai |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 434 days.

Signed and Sealed this

Twenty-sixth Day of October, 2010

David J. Kappos
*Director of the United States Patent and Trademark Office*